(No Model.)

T. P. SKELLENGER.
GATE LATCH.

No. 366,264. Patented July 12, 1887.

WITNESSES:

INVENTOR:
T. P. Skellenger
BY Munn & Co.
ATTORNEYS.

United States Patent Office.

THEODORE P. SKELLENGER, OF MORRISTOWN, NEW JERSEY.

GATE-LATCH.

SPECIFICATION forming part of Letters Patent No. 366,264, dated July 12, 1887.

Application filed October 2, 1886. Serial No. 215,150. (No model.)

*To all whom it may concern:*

Be it known that I, THEODORE P. SKELLENGER, of Morristown, in the county of Morris and State of New Jersey, have invented a new and Improved Gate-Latch, of which the following is a full, clear, and exact description.

The object of my invention is to provide a cheap and practical fastener for gates; and to this end my invention consists, principally, of a rotating bar fitted in the gate and bent to form a handle at one end and a catch at the other opposite to the handle, in combination with a latch-plate attached to the gate-post and formed with inwardly-projecting lips, as hereinafter described and claimed.

Reference is to be had to the accompanying drawings, forming a part of this specification, in which similar letters of reference indicate corresponding parts in all the views.

Figure 1:
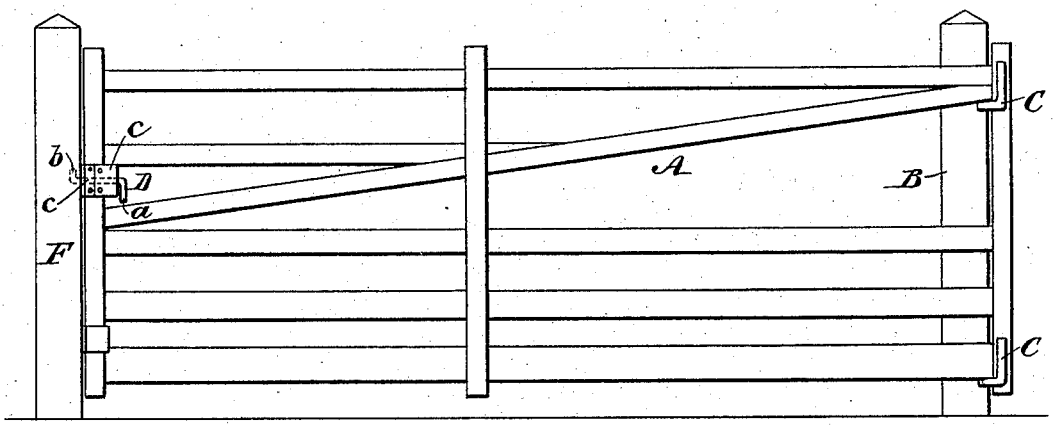
Figure 2:
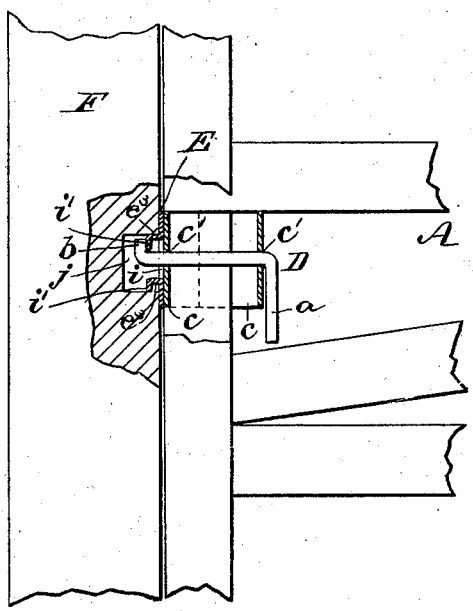
Figure 3:
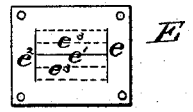

Figure 1 is a front elevation of a gate having my new fastener applied thereto. Fig. 2 is an enlarged view of the gate-post, gate, and fastener, the gate-post and gate being broken away to show the construction of the fastener; and Fig. 3 is a plan view of the blank for forming the latch-plate.

The gate A is of any approved construction, and in this instance of the sliding type, being attached to the post B by the staples C C.

D is the fastener. This is made of a bar of round iron bent at right angles to form the handle $a$, and bent again at the opposite end to form the catch $b$. The fastener D is held to the gate by the plates $c$, having corresponding orifices $c'$, in which the fastener is free to turn.

E represents the latch-plate, attached to the gate-post F. This latch-plate is formed of a blank shown in Fig. 3. This blank is slotted at $e$ $e'$ $e^2$ to form the two flanges $e^3$ $e^3$, which are opened to form the slot $i$ and bent to form the downwardly-projecting lips $i'$ $i'$, as shown in Fig. 2. The latch-plate is set into and over a recess, $j$, formed in the post F, so that the catch $b$ of the fastener may pass through the slot $i$ and be turned to engage with the upper flange $e^3$ of the latch-plate, and thus hold the gate closed, as shown clearly in Figs. 1 and 2.

In use, to open the gate the handle $a$ is to be grasped and turned to a horizontal position. This will turn the catch $b$ of the fastener parallel with the slot $i$ and disengage it from the lip $i'$, and thus unfasten the gate so it can be opened.

To close and fasten the gate, the handle $a$ is to be grasped and brought to horizontal position and the gate closed, causing the catch $b$ to enter the slot $i$. Then the handle $a$ has simply to be released, when its weight will turn the fastener and cause the catch $b$ to engage with the lip $i'$, and thus securely hold the gate.

Having thus fully described my invention, I claim as new and desire to secure by Letters Patent—

The latch-plate E, secured over the recess $j$ in the post F, and formed with the slot $i$, and inwardly-projecting flanges $e^3$, above and below the slot, each flange being formed with a downwardly-projecting lip, $i'$, in combination with the fastener D, formed with the catch $b$ and opposite handle $a$, and attached to the gate A by suitable fastenings in which it is adapted to rotate, substantially as described.

THEODORE P. SKELLENGER.

Witnesses:
   H. A. WEST,
   C. SEDGWICK.